Patented Sept. 13, 1932

1,877,615

UNITED STATES PATENT OFFICE

FRITZ STRAUB AND HANS MAYER, OF BASEL, SWITZERLAND, ASSIGNORS TO FIRM OF "SOCIETY OF CHEMICAL INDUSTRY IN BASLE", OF BASEL, SWITZERLAND

METALLIFEROUS AZO-DYESTUFFS AND PROCESS OF MAKING SAME

No Drawing. Application filed May 13, 1930, Serial No. 452,125, and in Switzerland May 28, 1929.

This invention is an improvement in or modification of that described in application Serial No. 397,140.

According to this invention valuable metalliferous dyestuffs which may contain one or more metals are obtained by treating an azo-dyestuff, derived from an unsulfonated diazo compound containing lake- and salt-forming groups in ortho-position to the diazo-group and any desired unsulfonated coupling component, with a group of insoluble compounds comprising oxides, hydroxides, basic carbonates, carbonates and sulfides of metals adapted to form complex compounds, the atomic weights of which metals lie above 55. Suitable metal agents are above all manganese, iron, cobalt, nickel, copper and zinc. These agents yielding metal may be used singly or in mixtures, with or without the addition of organic salts or alkaline, neutral or acid inorganic salts.

The metalliferous dyestuffs obtainable according to this invention are particularly applicable in the manufacture of colored varnishes fast to light, which are derived from cellulose esters or ethers or artificial and natural resins as bases.

The following examples illustrate the invention, the parts being by weight:—

Example 1

2.74 parts of the dyestuff from diazotized 4-nitro-2-amino-1-phenol and resorcinol of the formula:

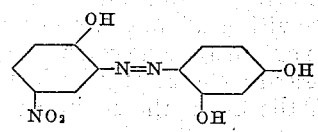

are dissolved in 250 parts of water to form a neutral solution and the latter is heated to boiling in a reflux apparatus for some time with a suspension of 8 parts of manganic oxide in the form of $Mn_2O_3$. After cooling, the dyestuff which has separated is filtered, together with the excess of metal oxide. From this residue the metal compound of the dyestuff is dissolved by means of dilute sodium carbonate solution and is then precipitated from the solution by neutralization with acetic acid. It is filtered, washer and dried at a moderate temperature. The product is a dark brown powder, which dissolves in water to some extent to a brown solution; in caustic soda solution easily to a deep brown solution and in concentrated sulfuric acid to a brown yellow solution. In organic solvents it is also freely soluble; its deep brown solution in nitrocellulose varnish yields on metal surfaces vivid brown coatings of very good fastness to light.

By using ferric oxide $(Fe_2O_3)$ instead of manganic oxide there is obtained in like manner a reddish colored varnish. With $Fe_3O_4$ a blackish brown of very good properties of fastness is obtained and with nickel oxide $(Ni_2O_3)$ a brown orange.

The corresponding dyestuff containing manganese made from diazotized anthranilic acid and resorcinol dissolves in nitrocellulose varnish with a yellow color and yields on metal surfaces brownish-yellow coatings.

When the operation described in this example is carried out in the presence of a neutral salt, such as common salt or an alkaline salt, such as sodium carbonate, or an acid salt, such as ammonium sulfate, with one of the named oxides or another metal oxide, such as $CO_2O_3$, ZnO or the like, there are obtained analogous metal complexes which, as compared with those obtained without such an addition, may have different properties in respect of shade, solubility and the like.

Example 2

6.57 parts of the dyestuff from diazotized 4-chloro-2-amino-1-phenol and 1-phenyl-3-methyl-5-pyrazolone of the formula

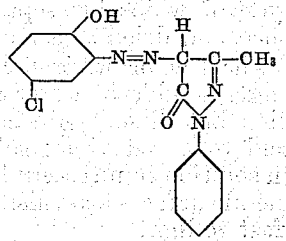

are boiled in 500 parts of water and then heated to boiling for some time in a reflux apparatus with a suspension of freshly precipitated ferric hydroxide corresponding in quantity with 1.2 part of iron. After cooling, the dyestuff which has separated is filtered, washed and dried at a moderate temperature. When dry it is an olive brown powder, very sparingly soluble in water, somewhat soluble in caustic soda, solution to a brown yellow solution and soluble in concentrated sulfuric acid to a brown red solution. Its greenish yellow solution in nitrocellulose varnish and other varnishes yields on metal surfaces greenish yellow coatings which are thoroughly fast to light.

Example 3

5.48 parts of the dyestuff from diazotized 4-nitro-2-amino-1-phenol and resorcinol of the formula

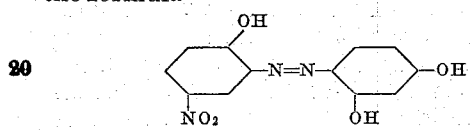

are dissolved hot in 400 parts of water and the solution is heated to boiling in a reflux apparatus for some time with freshly precipitated nickel hydroxide corresponding in quantity with 1.3 part of nickel. After cooling, the metal compound is precipitated by neutralization with acetic acid, filtered, washed and dried at a moderate temperature. The red brown powder is soluble sparingly in water, freely in caustic soda solution to a brown red solution and in concentrated sulfuric acid to a brown yellow solution. In organic solvents it dissolves freely to a brown yellow solution and its solution in commercial varnishes yields brownish yellow coatings of good fastness to light.

Example 4

5.97 parts of the dyestuff from diazotized 4-chloro-2-amino-1-phenol and β-naphthol of the formula

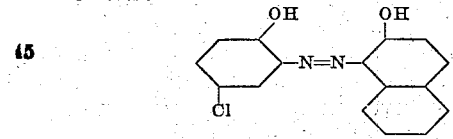

are boiled in 500 parts of water and heated to boiling for some time in a reflux apparatus with a quantity of freshly precipitated and neutral suspension of ferric hydroxide corresponding with 1.2 part of iron. After cooling, the dyestuff which has separated is filtered, washed and dried at a moderate temperature. The deep brown iron compound is very sparingly soluble in water and caustic soda solution but dissolves in concentrated sulfuric acid to a red violet solution. Its deep brown solution in nitrocellulose varnish yields on metal surfaces brownish black coatings very fast to light.

The mixed complex containing copper and iron made from the above azo-dyestuff dissolves in nitrocellulose varnish with a brown color and yields on metal surfaces brown coatings.

In analogous manner there is obtained from the dyestuff from diazotized 4-nitro-2-amino-1-phenol and resorcinol, a similar brown iron lake very fast to light.

Example 5

2.74 parts of the dyestuff from diazotized 4-nitro-2-amino-1-phenol and resorcinol of the formula

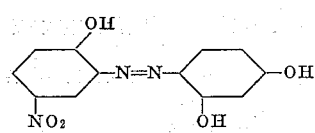

are dissolved hot in 250 parts of water and the solution, after addition of 5 parts of calcined sodium sulfate, is heated to boiling for some time with a quantity of freshly precipitated and neutral ferric hydroxide suspension corresponding with 0.6 part of iron. After cooling, the complex metal compound is completely precipitated by neutralization with acetic acid, filtered, washed and dried at a moderate temperature. The dyestuff is a brown powder which is sparingly soluble in water, freely in caustic soda solution to a deep brown solution and in concentrated sulfuric acid to a brown yellow solution. Its brown solution in nitrocellulose varnish yields on metal surfaces vivid brown coatings very fast to light.

Similar metal compounds are produced when in place of sodium sulfate as the added salt, there is used another neutral salt, such as common salt or sodium thiosulfate, or an alkaline salt, such as sodium acetate or sodium sulfite, or an acid salt, such as primary sodium phosphate or sodium bisulfite.

Under analogous conditions other dyestuff combinations of this kind can be converted into the corresponding complex metal compounds.

Instead of preparing the necessary metal hydroxide by washing it neutral after precipitation, it is equally possible to operate directly with the precipitation mixture obtained by precipitating a solution of the required metal salt with the theoretically necessary proportion of caustic soda solution, such mixture necessarily containing besides the hydroxide of the metal the sodium salt of the acid of the metal salt.

Example 6

5.97 parts of the dyestuff from diazotized 4-chloro-2-amino-1-phenol and β-naphthol of the formula

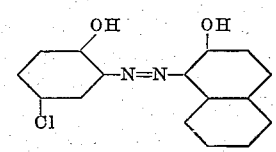

are boiled in 500 parts of water and 5 parts of tertiary sodium phosphate (Na$_3$PO$_4$—10H$_2$O) and then heated to boiling for some time in a reflux apparatus with a quantity of freshly precipitated and neutral ferric hydroxide suspension corresponding with 1.2 part of iron. After cooling, the dyestuff which has separated is filtered, washed, dried at a moderate temperature. Its dark brown iron compound dissolves very sparingly in water and caustic soda solution and in concentrated sulfuric acid to a red violet solution. Its deep brown solution in nitrocellulose varnish yields on metal surfaces dark brown to black coatings of very good fastness to light.

If, instead of the sodium phosphate another alkaline salt, such as sodium bicarbonate or sodium acetate, is used analogous products are obtained.

With nickel carbonate, with or without addition of inorganic or organic salts, products are obtained which color varnishes orange tints fast to light.

In similar manner there is obtained, for example, from the dyestuff 4-nitro-2-amino-1-phenol → resorcinol with iron carbonate a brown lake.

*Example 7*

2.63 parts of the dyestuff from diazotized 4-chloro-2-amino-1-phenol and resorcinol of the formula

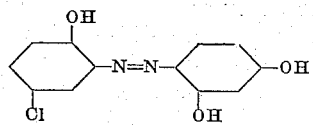

are dissolved in 250 parts of water and the solution is heated to boiling for some time in a reflux apparatus with a quantity of freshly precipitated and washed zinc carbonate corresponding with 0.7 parts of zinc. After cooling, the mixture is neutralized with acetic acid, the separated dyestuff is filtered, washed and dried at a moderate temperature. Its zinc compound is a red yellow powder which is sparingly soluble in water, easily in caustic soda solution to a deep red solution and in concentrated sulfuric acid to a brown yellow solution. Its brown yellow solution in nitrocellulose varnish yields on metal surfaces brownish yellow coatings.

*Example 8*

2.63 parts of the dyestuff from diazotized 4-chloro-2-amino-1-phenol and resorcinol of the formula

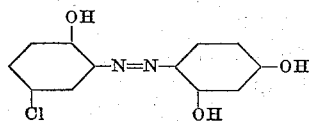

are boiled in 250 parts of water and the mixture is heated to boiling in a reflux apparatus for some time with a freshly precipitated and neutral suspension of cobalt sulfide corresponding with 0.65 part of cobalt. After cooling, the cobalt compound is precipitated by addition of some common salt, washed and dried at a moderate temperature. It is a dark brown powder which dissolves in water to a red solution, in caustic soda solution to a deep red solution and in concentrated sulfuric acid to a brown yellow solution. Its bluish red solution in nitrocellulose varnish yields on metal surfaces red coatings.

By treatment with cobalt sulfide with addition of 5 parts of sodium acetate there is obtained a cobalt compound of essentially the same properties.

In place of sodium acetate other salts of alkaline reaction may be used with the same result, such as sodium bicarbonate, or tertiary sodium phosphate; also neutral salts, such as sodium sulfate; or acid salts, such as primary sodium phosphate or, finally, sodium carbonate, caustic soda solution or sodium sulfite and other alkalies.

What we claim is:—

1. Process for the manufacture of metal compounds of unsulfonated azo-dyestuffs, consisting in treating azo-dyestuffs obtainable by coupling unsulfonated diazo components of the benzene series containing lake-forming groups in ortho-position to the diazogroup with unsulfonated coupling components of the benzene, naphthalene and pyrazolone series, with a member of the group of metal compounds consisting of the oxides, hydroxides, basic carbonates, carbonates and sulfides of such metals capable of producing complex metal compounds with the lake-forming groups of the azo-dyestuffs the atomic weights of which metals lie above 55.

2. Process for the manufacture of metal compounds of unsulfonated azo-dyestuffs, consisting in treating azo-dyestuffs, obtainable by coupling unsulfonated ortho-hydroxy-diazo compounds of the benzene series with unsulfonated coupling components of the benzene, naphthalene and pyrazolone series, with a member of the group of metal compounds consisting of the oxides, hydroxides, basic carbonates, carbonates, carbonates and sulfides of such metals capable of producing complex metal compounds with the lake-forming groups of the azo-dyestuffs the atomic weights of which metals lie above 55.

3. Process for the manufacture of metal compounds of unsulfonated azo-dyestuffs, consisting in treating azo-dyestuffs, obtainable by coupling unsulfonated ortho-hydroxy-diazo compounds of the benzene series with unsulfonated coupling components of the benzene, naphthalene and pyrazolone series with a member of the group of metal compounds consisting of the oxides, hydroxides, basic carbonates, carbonates and sulfides of metals the atomic weight of which metals range between 55 and 66.

4. Process for the manufacture of metal compounds of unsulfonated azo-dyestuffs, consisting in treating azo-dyestuffs, obtainable by coupling unsulfonated ortho-hydroxy-diazo compounds of the benzene series with unsulfonated coupling components of the benzene, naphthalene and pyrazolone series, with a member of the group of metal compounds consisting of the oxides and hydroxides of metals the atomic weights of which metals range between 55 and 66.

5. Process for the manufacture of metal compounds of unsulfonated azo-dyestuffs, consisting in treating azo-dyestuffs, obtainable by coupling unsulfonated ortho-hydroxy-diazo compounds of the benzene series with unsulfonated hydroxy compounds of the benzene and naphthalene series capable of coupling, with a member of the group of metal compounds consisting of the oxides and hydroxides of metals the atomic weights of which metals range between 55 and 66.

6. Process for the manufacture of metal compounds of unsulfonated azo-dyestuffs, consisting in treating azo-dyestuffs, obtainable by coupling unsulfonated ortho-hydroxy-diazo compounds of the benzene series with unsulfonated hydroxy compounds of the benzene and naphthalene series capable of coupling, with a member of the group of metal compounds consisting of the hydroxides of metals the atomic weights of which metals range between 56 and 63.6.

7. Process for the manufacture of an azo-dyestuff containing iron, consisting in treating an azo-dyestuff, obtainable by coupling 4-chloro-2-diazo-1-phenol with β-naphthol, with any one of the hydroxides of iron.

8. As new products the metal compounds of azo-dyestuffs which correspond with the azo-dyestuffs of the general formula

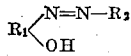

wherein $R_1$ is an unsulfonated and uncarboxylated benzene radicle, $R_2$ is an unsulfonated and uncarboxylated benzene, naphthalene or pyrazolone radicle, and the hydroxy group stands in ortho-position to the azo-bridge, which metal compounds are obtained by treating these azo-dyestuffs with a member of the group of metal compounds consisting of the oxides, hydroxides, basic carbonates, carbonates and sulfides of such metals capable of producing complex metal compounds with the hydroxy groups of the azo-dyestuffs the atomic weights of which metals lie above 55, and which products form, when dry, dark powders, soluble in many organic solvents and in the usual varnishes with various colors.

9. As new products the metal compounds of azo-dyestuffs which correspond with the azo-dyestuffs of the general formula

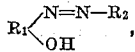

wherein $R_1$ is an unsulfonated and uncarboxylated benzene radicle, $R_2$ is an unsulfonated and uncarboxylated benzene, naphthalene or pyrazolone radicle, and the hydroxy group stands in ortho-position to the azo-bridge, which metal compounds are obtained by treating these azo-dyestuffs with a member of the group of metal compounds consisting of the oxides, hydroxides, basic carbonates, carbonates and sulfides of metals the atomic weights of which metals lie between 55 and 66, and which products form, when dry, dark powders, soluble in many organic solvents and in the usual varnishes with green-yellow, brown-yellow, brown, red and black colors.

10. As new products the metal compounds of azo-dyestuffs which correspond with the azo-dyestuffs of the general formula

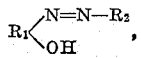

wherein $R_1$ is an unsulfonated and uncarboxylated benzene radicle, $R_2$ is an unsulfonated and uncarboxylated benzene, naphthalene or pyrazolone radicle, and the hydroxy group stands in ortho-position to the azo-bridge, which metal compounds are obtained by treating these azo-dyestuffs with a member of the group of metal compounds consisting of the oxides and hydroxides of metals the atomic weights of which metals lie between 55 and 66, and which products form, when dry, dark powders, soluble in many organic solvents and in the usual varnishes with green-yellow, brown-yellow, brown, red and black colors.

11. As new products the metal compounds of azo-dyestuffs which correspond with the azo-dyestuffs of the general formula

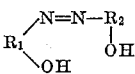

wherein $R_1$ is an unsulfonated and uncarboxylated benzene radicle, $R_2$ is an unsulfonated and uncarboxylated benzene, naphthalene or pyrazolone radicle and the hydroxy group of the benzene radicle $R_1$ stands in ortho-position to the azo-bridge, which metal compounds are obtained by treating these azo-dyestuffs with a member of the group of metal compounds consisting of the oxides and hydroxides of metals the atomic weights of which metals lie between 55 and 66, and which products form, when dry, dark powders, soluble in many organic solvents and in the usual varnishes with brown-yellow, brown, red and black colors.

12. As new products the metal compounds of azo-dyestuffs which correspond with the azo-dyestuffs of the general formula

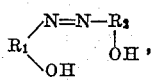

wherein $R_1$ is an unsulfonated and uncarboxylated benzene radicle, $R_2$ is an unsulfonated and uncarboxylated benzene, naphthalene or pyrazolone radicle and the hydroxy group of the benzene radicle $R_1$ stands in ortho-position to the azo-bridge, which metal compounds are obtained by treating these azo-dyestuffs with a member of the group of metal compounds consisting of the hydroxides of metals the atomic weights of which metals lie between 56 and 63.6, and which products form, when dry, dark powders, soluble in many organic solvents and in the usual varnishes with brown-yellow, brown, red and black colors.

13. As new products the metal compounds of azo-dyestuffs which correspond with the azo-dyestuffs of the general formula

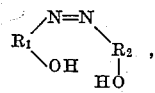

wherein $R_1$ stands for an unsulfonated and uncarboxylated benzene radicle, $R_2$ for an unsulfonated and uncarboxylated naphthalene radicle, and the hydroxy group of the benzene radicle $R_1$ stands in ortho-position to the azo-bridge, which metal compounds are obtained by treating these azo-dyestuffs with a member of the group of metal compounds consisting of the hydroxides of metals the atomic weights of which metals lie between 56 and 63.6, and which products form, when dry, dark powders, soluble in many organic solvents and in the usual varnishes with brown and black colors.

14. As a new product the iron compound of the azo-dyestuff which corresponds with the azo-dyestuff of the formula

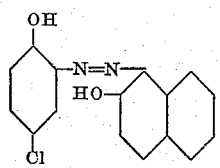

which compound is obtained by treating this azo-dyestuff with any one of the hydroxides of iron, the product thus obtained forming, when dry, a dark powder and dissolving in many organic solvents and in the usual varnishes with black color.

In witness whereof we have hereunto signed our names this 3rd day of May, 1930.

FRITZ STRAUB.
HANS MAYER.